(12) United States Patent
Yamamoto

(10) Patent No.: US 8,715,883 B2
(45) Date of Patent: May 6, 2014

(54) FUEL CELL POWER GENERATION SYSTEM WITH PARTITION WALL FOR MAIN BODY PACKAGE

(75) Inventor: Hideo Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 71 days.

(21) Appl. No.: 13/562,437

(22) Filed: Jul. 31, 2012

(65) Prior Publication Data

US 2012/0295173 A1     Nov. 22, 2012

Related U.S. Application Data

(62) Division of application No. 12/746,414, filed as application No. PCT/JP2008/003581 on Dec. 3, 2008.

(30) Foreign Application Priority Data

| Dec. 5, 2007 | (JP) | ................................. 2007-314330 |
| Jun. 24, 2008 | (JP) | ................................. 2008-164096 |
| Oct. 9, 2008 | (JP) | ................................. 2008-262538 |

(51) Int. Cl.
*H01M 2/08* (2006.01)
*H01M 8/24* (2006.01)

(52) U.S. Cl.
CPC ............ *H01M 8/247* (2013.01); *H01M 8/2475* (2013.01)
USPC ............................ 429/508; 429/431; 429/452

(58) Field of Classification Search
CPC . H01M 8/247; H01M 8/2465; H01M 8/2475; H01M 8/2485
USPC .......................................... 429/431, 452, 508
See application file for complete search history.

(56) References Cited

U.S. PATENT DOCUMENTS

| 5,948,221 A | 9/1999 | Hsu |
| 6,024,859 A | 2/2000 | Hsu |
| 6,215,272 B1 | 4/2001 | Ohara et al. |
| 2002/0081468 A1 | 6/2002 | Shioya |

(Continued)

FOREIGN PATENT DOCUMENTS

| CN | 1372344 A | 10/2002 |
| EP | 1009054 A2 | 6/2000 |

(Continued)

OTHER PUBLICATIONS

International Search Report for International Application No. PCT/JP2008/003581, dated Mar. 17, 2009, 2 pages.

(Continued)

*Primary Examiner* — Zachary Best
(74) *Attorney, Agent, or Firm* — Brinks Gilson & Lione

(57) ABSTRACT

There is provided a fuel cell power generation system in which power loss in a power line electrically connecting a stack and a power conversion circuit, thereby attaining high power generation efficiency. A reformer and the stack are disposed in a main body package. Stack output terminals 31 are provided in both ends in a stacking direction of the stack. A power conversion circuit is disposed in the main body package and arranged in the proximity to the stack. Power conversion circuit input terminals are provided on the power conversion circuit and arrayed in a direction parallel to the stacking direction of the stack. Stack output lines electrically connect the stack output terminals and the power conversion circuit input terminals.

6 Claims, 10 Drawing Sheets

(56) References Cited

U.S. PATENT DOCUMENTS

| | | |
|---|---|---|
| 2002/0094462 A1 | 7/2002 | Shioya et al. |
| 2002/0106540 A1 | 8/2002 | Shioya |
| 2002/0127446 A1* | 9/2002 | Ueda et al. .................... 429/19 |
| 2004/0251858 A1 | 12/2004 | Asao et al. |
| 2005/0042488 A1 | 2/2005 | Niedzwiecki et al. |
| 2005/0052029 A1 | 3/2005 | Aldridge et al. |
| 2005/0233189 A1 | 10/2005 | Shioya |
| 2006/0020977 A1 | 1/2006 | Takagi |
| 2006/0240297 A1* | 10/2006 | Takeda et al. .................. 429/22 |
| 2006/0251943 A1 | 11/2006 | Hatoh et al. |
| 2006/0280977 A1 | 12/2006 | Sakajo et al. |
| 2007/0114083 A1 | 5/2007 | Asao et al. |
| 2008/0075989 A1 | 3/2008 | Yamamoto et al. |

FOREIGN PATENT DOCUMENTS

| | | |
|---|---|---|
| EP | 1758196 A1 | 2/2007 |
| JP | 05-290868 A | 11/1993 |
| JP | 08-213039 A | 8/1996 |
| JP | 10-255829 A | 9/1998 |
| JP | 2002-329515 A | 11/2002 |
| JP | 2002-358992 A | 12/2002 |
| JP | 2003-297409 A | 10/2003 |
| JP | 2004-111208 A | 4/2004 |
| JP | 2004-291891 A | 10/2004 |
| JP | 2004-317043 A | 11/2004 |
| JP | 2005-032461 A | 2/2005 |
| JP | 2005032461 A * | 2/2005 |
| JP | 2005-291615 A | 10/2005 |
| JP | 2006-086017 A | 3/2006 |
| JP | 2006-228613 A | 8/2006 |
| JP | 2006-294409 A | 10/2006 |
| JP | 2006-351325 A | 12/2006 |
| JP | 2007-059288 A | 3/2007 |
| JP | 2008-218360 A | 9/2008 |
| RU | 2 180 978 C2 | 7/2001 |
| RU | 2239931 C2 | 11/2004 |
| RU | 2 294 045 C2 | 5/2005 |

OTHER PUBLICATIONS

International Preliminary Report on Patentability for International Application No. PCT/JP2008/003581, dated Sep. 7, 2010, 7 pages.

Decision on Grant for counterpart Russian Application No. 2010127272/07, dated Mar. 13, 2012, 15 pages (with translation).

Office Action from co-pending U.S. Appl. No. 12/746,414, dated Jul. 24, 2012, 9 pages.

Decision on Grant, and English translation thereof, in corresponding Russian Federation Application No. 2012122854/07, dated Jul. 26, 2013, 12 pages.

Extended European Search Report for European Application No. 08856533.8, dated Jan. 2, 2014, 10 pages.

Extended European Search Report in corresponding European Application No. 13005680.7, dated Feb. 25, 2014, 6 pages.

* cited by examiner ns in the main body package 300.
FUEL CELL POWER GENERATION SYSTEM WITH PARTITION WALL FOR MAIN BODY PACKAGE This application is a divisional application of U.S. patent application Ser. No. 12/746,414 filed on Jun. 4, 2010, which is a 371 application of PCT/JP2008/003581 having an international filing date of Dec. 3, 2008, which claims priority to JP2007-314330 filed Dec. 5, 2007, JP2008-164096 filed Jun. 24, 2008 and JP2008-262538 filed Oct. 9, 2008, the entire contents of which are incorporated herein by reference.

TECHNICAL FIELD

The present invention relates to a fuel cell power generation system which makes hydrogen and oxygen react with each other to generate electric power.

BACKGROUND ART

As a conventional fuel cell power generation system, there is a configuration in which a partition wall is provided in a main body package to separate the inside of the package into a gas using area where a reformer and a stack are arranged, and a non-gas area where a control device is arranged (for example, see Patent Document 1).

FIG. 12 shows a first example of the conventional fuel cell power generation system disclosed in Patent Document 1. The system includes a first chamber 102 and a second chamber 103 defined by partitioning the inside of a package 100 by a partition wall 101, a reformer 104 arranged inside the first chamber 102, a fuel cell body 105 arranged in the first chamber, a control device 106 arranged in the second chamber to control the reformer 104 and the fuel cell body 105, and an air blower 107 which supplies air to the fuel cell body 105, so that the first chamber 102 and the second chamber 103 are independently subjected to ventilation.

As the conventional fuel cell power generation system, there is a configuration in which a main body package which houses a fuel cell body, and a hot water storage package which houses a hot water storage tank are separately formed, and the fuel cell body and the hot water storage package are connected together by a hot water pipe and a cold water pipe (for example, see Patent Document 2).

FIG. 13 shows a second example of the conventional fuel cell power generation system disclosed in Patent Document 2. In a main body package 300, there are disposed: a reformer 301 which reforms town gas supplied from a town gas supplying pipe by a steam reforming reaction into hydrogen-rich fuel gas; a solid polymeric fuel cell stack 302 which receives the fuel gas supplied from the reformer 301 and air to generate electric power; a heat exchanger 303 which is incorporated into a circulation flow passage for a cooling medium (cooling water, etc.) of the fuel cell stack 302; a condenser 304 which condenses the steam in the exhaust gas from the fuel cell stack 302 to recover water; a water system 307 which receives the cold water supplied from a cold water pipe 306 connected to the bottom of the cold water storage tank 305 to perform the supply of water to the reformer 301, and the supply of cooling water to the condenser 304 and the heat exchanger 303; a power conversion circuit 308 which converts DC power from the fuel cell stack 302 into AC power to supply the converted AC power to a wiring line from a commercial power source; and a control device 309 which controls respective components in the main body package 300.

In the hot water storage package 310, as shown in the drawing, a hot water storage tank 305 is disposed such that a water supplying pipe from a water pipe is attached to the bottom of the tank, and the hot water pipe is attached to the top of the tank. The cold water pipe 306 and the hot water pipe 311 which are connected to the main body package 300 are attached to the bottom and top of the hot water storage tank 305.

[Patent Document 1] Japanese Patent Publication No. 2002-329515A
[Patent Document 2] Japanese Patent Publication No. 2004-111208A

DISCLOSURE OF THE INVENTION

Problems to be Solved by the Invention

Nowadays, for the spread and expansion of fuel cell power generation systems, drastic cost reduction is required. The technical trend of a stack is to reduce the number of stacked sheets with the object of cost reduction and downsizing. Since the stack voltage drops when the number of stacked sheets is reduced, it is necessary to increase an electric current.

However, in the configuration of the first conventional example, since the fuel cell body (stack) 105, and the control device 106 including a power conversion circuit which converts DC power generated in the fuel cell body (stack) 105 into AC power are arranged apart from each other, there is a problem in that the power loss in power lines which electrically connect the fuel cell body (stack) 105 and the power conversion circuit becomes large.

In the second conventional example, the main body package 300 which houses the fuel cell body, and the hot water storage package 310 which houses the hot water storage tank 305 are separately provided. Therefore, there is a problem in that an installation space of considerable width is required in order to introduce the fuel cell system into buildings, such as houses.

The invention was made to solve the above conventional problems, and the object thereof is to provide a fuel cell power generation system in which the power loss in power lines which electrically connect a stack and a power conversion circuit is reduced.

It is another object of the invention to provide a space-saving fuel cell power generation system capable of installing a fuel cell in a building so as not to obstruct daily life, and effectively utilizing electric power and heat.

In order to achieve the above object, according to the present invention, there is provided a fuel cell power generation system, comprising: a main body package; a reformer disposed in the main body package; a stack disposed in the main body package; stack output terminals provided in both ends in a stacking direction of the stack; a power conversion circuit disposed in the main body package and arranged in the proximity to the stack; power conversion circuit input terminals provided on the power conversion circuit and arrayed in a direction parallel to the stacking direction of the stack; and stack output lines electrically connecting the stack output terminals and the power conversion circuit input terminals.

With this configuration, the stack and the power conversion circuit can be electrically connected with the shortest distance. Accordingly, it is possible to reduce the power loss in the power lines electrically connecting the stack and the power conversion circuit.

According to the invention, there is also provided a fuel cell power generation system, comprising: a main body package; a hot water storage tank disposed in the main body package; a stack disposed in the main body package; a reformer disposed in the main body package; an electric circuit disposed in the main body package and comprising: a high-voltage circuit including a power conversion circuit; and a low-voltage circuit; a ventilation fan disposed in the main body package and configured to discharge air in the main body package to an exterior of the main body package; an air intake port provided in a lower part of the main body package which is below the stack and the reformer; and a partition wall partitioning an interior of the main body package into a space in which the stack and the reformer are disposed and a space in which the high-voltage circuit is disposed, wherein: the ventilation fan is disposed in an upper part of the space in which the stack and the reformer are disposed; the stack, the reformer and the electric circuit are vertically arranged in a lateral side of the hot water storage tank so as to be substantially the same height with the hot water storage tank; and the high-voltage circuit is arranged above the stack and the reformer.

With this configuration, the fuel cell and the hot water storage tank are accommodated in the main body package, so that it is possible to provide a space-saving fuel cell power generation system integrated with a hot water storage tank.

Even if inflammable gas, such as material gas and hydrogen, has leaked from the reformer or the stack, the inflammable gas leaks into the main body package in which the reformer and the stack are provided. However, the ambient air sucked from the air intake port provided in the lower portion of the main body package below the reformer and the stack pushes out the inflammable gas which has leaked into the main body package. Then, the inflammable gas is exhausted to the outside by the ventilation fan provided in the upper portion of the space where the stack and the reformer in the main body package are arranged.

Even if, at the worst, an arc happens to be generated under a condition that dust is accumulated on a contact of the high-voltage circuit after long-term use in an environment with a great deal of dust, or a condition that moisture is adhered to the contact of the high-voltage circuit after long-term use in high-humidity environment, inflammable gas such as material gas or hydrogen will not reach the high-voltage circuit because the inside of the main body package is separated by the partition wall into a space where the stack and the reformer are arranged and a space where the high-voltage circuit is arranged. Accordingly, danger such as explosion is definitely eliminated.

Advantageous Effects of the Invention

According to the invention, since the stack and the power conversion circuit are arranged close to each other, and the stack and the power conversion circuit are electrically connected together at the shortest distance, the power loss in the stack output lines which connect the stack and the power conversion circuit together can be reduced, and a fuel cell power generation system with high power generation efficiency can be provided.

According to the invention, a space-saving fuel cell power generation system integrated with a hot water storage tank can be provided. Even if inflammable gas, such as material gas and hydrogen, has leaked from the reformer or the stack, or, at the worst, an arc happens to be generated under a condition that dust is accumulated on a contact of the high-voltage circuit after long-term use in an environment with a great deal of dust, or a condition that moisture is adhered to the contact of the high-voltage circuit after long-term use in high-humidity environment, danger such as explosion is definitely eliminated.

BEST MODE FOR CARRYING OUT THE INVENTION

Figure 1:
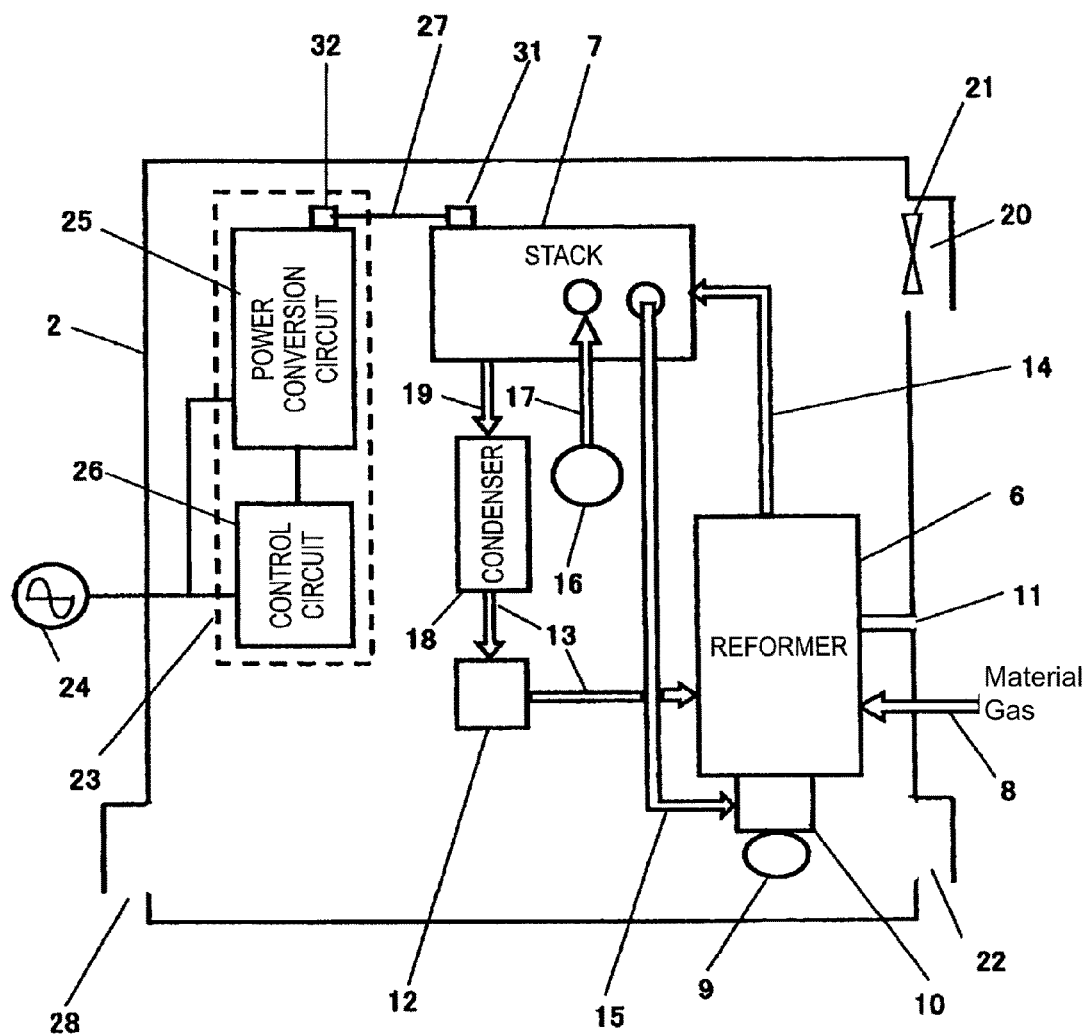
FIG. 1 is a view showing a configuration of a fuel cell power generation system according to a first embodiment of the invention.

According to the first aspect of the invention, there is provided A fuel cell power generation system, comprising: a main body package; a reformer disposed in the main body package; a stack disposed in the main body package; stack output terminals provided in both ends in a stacking direction of the stack; a power conversion circuit disposed in the main body package and arranged in the proximity to the stack; power conversion circuit input terminals provided on the power conversion circuit and arrayed in a direction parallel to the stacking direction of the stack; and stack output lines electrically connecting the stack output terminals and the power conversion circuit input terminals.

With this configuration, the stack and the power conversion circuit is electrically connected with the shortest distance. Accordingly, it is possible to reduce power loss in the stack output lines electrically connecting the stack and the power conversion circuit to enhance power generation efficiency of the fuel cell power generation system.

According to the second aspect of the invention, the fuel cell power generation system of the first aspect of the invention further comprises a partition wall partitioning an interior of the main body package into a first chamber and a second chamber, and defining a gap in an upper part thereof. The reformer and the stack are disposed in the first chamber. The power conversion circuit and a control circuit are disposed in the second chamber. The stack output lines electrically connecting the stack and the power conversion circuit extend through the gap.

With this configuration, the stack and the power conversion circuit is electrically connected with the shortest distance. Accordingly, it is possible to reduce power loss in the stack output lines electrically connecting the stack and the power conversion circuit to enhance power generation efficiency of the fuel cell power generation system.

According to the third aspect of the invention, in the second aspect of the invention, the stacking direction of the stack is parallel to the partition wall.

With this configuration, the stack and the power conversion circuit is electrically connected with the shortest distance. Accordingly, it is possible to reduce power loss in the stack output lines electrically connecting the stack and the power conversion circuit to enhance power generation efficiency of the fuel cell power generation system.

According to the fourth aspect of the invention, in the second aspect of the invention, the stack is disposed in the proximity to the partition wall and a top face of the main body package. The power conversion circuit is disposed in the proximity to the partition wall and the top face of the main body package.

With this configuration, the stack and the power conversion circuit is electrically connected with the shortest distance. Accordingly, it is possible to reduce power loss in the stack output lines electrically connecting the stack and the power conversion circuit to enhance power generation efficiency of the fuel cell power generation system.

According to the fifth aspect of the invention, in the second aspect of the invention, the stack and the power conversion circuit oppose each other across the partition wall.

With this configuration, the stack and the power conversion circuit is electrically connected with the shortest distance. Accordingly, it is possible to reduce power loss in the stack output lines electrically connecting the stack and the power conversion circuit to enhance power generation efficiency of the fuel cell power generation system.

According to the sixth aspect of the invention, in the second aspect of the invention, a top face of the stack and an upper face of the power conversion circuit are made to be substantially the same height.

With this configuration, the stack and the power conversion circuit is electrically connected with the shortest distance. Accordingly, it is possible to reduce power loss in the stack output lines electrically connecting the stack and the power conversion circuit to enhance power generation efficiency of the fuel cell power generation system.

According to the seventh aspect of the invention, in the second aspect of the invention, the stack output lines electrically connect the stack terminals provided on a top face of the stack and the power conversion circuit input terminals provided on an upper face of the power conversion circuit.

With this configuration, the stack and the power conversion circuit is electrically connected with the shortest distance. Accordingly, it is possible to reduce power loss in the stack output lines electrically connecting the stack and the power conversion circuit to enhance power generation efficiency of the fuel cell power generation system.

According to the eighth aspect of the invention, there is provided a fuel cell power generation system, comprising: a main body package; a hot water storage tank disposed in the main body package; a stack disposed in the main body package; a reformer disposed in the main body package; an electric circuit disposed in the main body package and comprising: a high-voltage circuit including a power conversion circuit; and a low-voltage circuit; a ventilation fan disposed in the main body package and configured to discharge air in the main body package to an exterior of the main body package; an air intake port provided in a lower part of the main body package which is below the stack and the reformer; and a partition wall partitioning an interior of the main body package into a space in which the stack and the reformer are disposed and a space in which the high-voltage circuit is disposed, wherein: the ventilation fan is disposed in an upper part of the space in which the stack and the reformer are disposed; the stack, the reformer and the electric circuit are vertically arranged in a lateral side of the hot water storage tank so as to be substantially the same height with the hot water storage tank; and the high-voltage circuit is arranged above the stack and the reformer.

With the above configuration that the fuel cell and the hot water storage tank are disposed in the main body package, it is possible to provide a space-saving fuel cell power generation system integrated with a hot water storage tank.

Even if inflammable gas, such as material gas and hydrogen, has leaked from the reformer or the stack, the inflammable gas leaks into the main body package in which the reformer and the stack are provided. However, the ambient air sucked from the air intake port provided in the lower portion of the main body package below the reformer and the stack pushes out the inflammable gas which has leaked into the main body package. Then, the inflammable gas is exhausted to the outside by the ventilation fan provided in the upper portion of the space where the stack and the reformer in the main body package are arranged.

Even if, at the worst, an arc happens to be generated under a condition that dust is accumulated on a contact of the high-voltage circuit after long-term use in an environment with a great deal of dust, or a condition that moisture is adhered to the contact of the high-voltage circuit after long-term use in high-humidity environment, inflammable gas such as material gas or hydrogen will not reach the high-voltage circuit because the inside of the main body package is separated by the partition wall into a space where the stack and the reformer are arranged and a space where the high-voltage circuit is arranged. Accordingly, danger such as explosion is definitely eliminated.

According to the ninth aspect of the invention, there is provided a fuel cell power generation system, comprising: a main body package having a first chamber and a second chamber; a hot water storage tank disposed in the first chamber; a stack disposed in the second chamber; a reformer disposed in the second chamber; an electric circuit disposed in the second chamber and comprising: a high-voltage circuit including a power conversion circuit; and a low-voltage circuit; a ventilation fan disposed in the second chamber and configured to discharge air in the second chamber to an exterior of the main body package; an air intake port provided in a lower part of the second chamber which is below the stack and the reformer; and a partition wall partitioning the second chamber into a space in which the stack and the reformer are disposed and a space in which the high-voltage circuit is disposed, wherein: the ventilation fan is disposed in an upper part of the space in which the stack and the reformer are disposed; the stack, the reformer and the electric circuit are vertically arranged in a lateral side of the hot water storage tank so as to be substantially the same height with the hot water storage tank; and the high-voltage circuit is arranged above the stack and the reformer.

Namely, the ninth aspect of the invention can be provided, in the eight aspect of the invention, by disposing the hot water storage tank in the first chamber, and disposing the stack, the reformer, the electric circuit, the ventilation fan, and the air intake port in the second chamber. Similarly to the eight aspect of the invention, it is possible to provide a space-saving fuel cell power generation system integrated with a hot water storage tank.

Even if, at the worst, an arc happens to be generated under a condition that dust is accumulated on a contact of the high-voltage circuit after long-term use in an environment with a great deal of dust, or a condition that moisture is adhered to the contact of the high-voltage circuit after long-term use in high-humidity environment, inflammable gas such as material gas or hydrogen will not reach the high-voltage circuit because the inside of the main body package is separated by the partition wall into a space where the stack and the reformer are arranged and a space where the high-voltage circuit is arranged. Accordingly, danger such as explosion is definitely eliminated.

According to the tenth aspect of the invention, in the eighth or ninth aspect of the invention, the stack and the power conversion circuit oppose each other across the partition wall.

With this configuration, the stack and the power conversion circuit are made close to each other, and electrically connected together with a short distance. Accordingly, it is possible to reduce copper loss in the stack output lines electrically connecting the stack and the power conversion circuit to reduce power loss in the stack output lines and to enhance power generation efficiency of the fuel cell power generation system.

According to the eleventh aspect of the invention, in the tenth aspect of the invention, a stacking direction of the stack is substantially parallel to a board face of the power conversion circuit.

With this configuration, the stack and the power conversion circuit are electrically connected together with the shortest distance. Accordingly, it is possible to further reduce, than the tenth aspect of the invention, copper loss in the stack output lines electrically connecting the stack and the power conversion circuit to reduce power loss in the stack output lines and to enhance power generation efficiency of the fuel cell power generation system.

According to the twelfth aspect of the invention, in the eleventh aspect of the invention, the stack comprises: a stack positive terminal provided in an upper portion of one end of the stacking direction; and a stack negative terminal provided in an upper portion of the other end of the stacking direction. A power conversion circuit positive terminal and a power conversion circuit negative terminal are provided in a lower part of the power conversion circuit. The stack positive terminal and the power conversion positive terminal substantially oppose each other across the partition wall. The stack negative terminal and the power conversion negative terminal substantially oppose each other across the partition wall.

With this configuration, both of the pair of the stack positive terminal and the power conversion circuit positive terminal and the pair of the stack negative terminal and the power conversion circuit negative terminal can be electrically connected together with the shortest distance. Accordingly, it is possible to further reduce, than the eleventh aspect of the invention, copper loss in the stack output lines electrically connecting the stack and the power conversion circuit to reduce power loss in the stack output lines and to enhance power generation efficiency of the fuel cell power generation system.

According to the thirteenth aspect of the invention, in the twelfth aspect of the invention, the partition wall is formed with a pair of through holes. The stack positive terminal and the power conversion circuit positive terminal are electrically connected by a positive output line extending through one of the through holes. The stack negative terminal and the power conversion circuit negative terminal are electrically connected by a negative output line extending through the other one of the through holes.

With this configuration, the stack positive terminal and the power conversion circuit positive terminal are electrically connected by a positive output line extending through one of the through holes with the shortest distance, and the stack negative terminal and the power conversion circuit negative terminal are electrically connected by a negative output line extending through the other one of the through holes with the shortest distance. Accordingly, similarly to the twelfth aspect of the invention, it is possible to further reduce, than the eleventh aspect of the invention, copper loss in the stack output lines electrically connecting the stack and the power conversion circuit to reduce power loss in the stack output lines and to enhance power generation efficiency of the fuel cell power generation system.

Embodiments of a fuel cell power generation system of the present invention will be described with reference to the accompanying drawings. The present invention will not be limited by these embodiments.

(First Embodiment)

Figure 2:
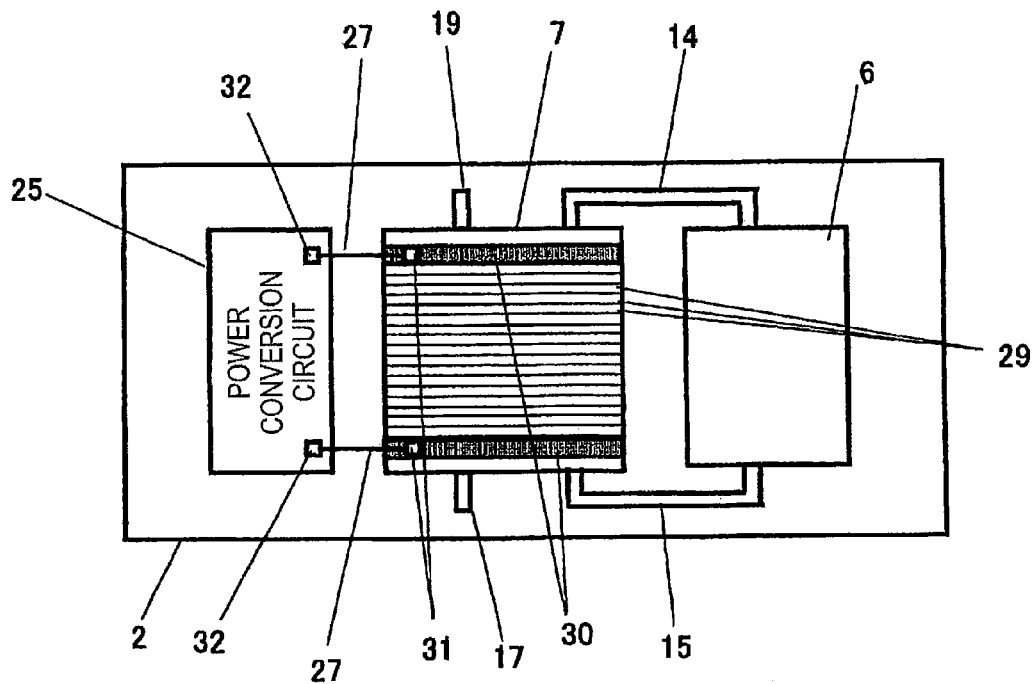
FIG. 2 is a top view of the fuel cell power generation system.

FIGS. 1 and 2 are views showing a configuration of a fuel cell power generation system according to a first embodiment of the invention.

As shown in FIGS. 1 and 2, components such as a reformer 6 and a stack 7, through which inflammable gas circulates are arranged in a main body package 2.

A material gas supplying pipe 8, a burner 10 to which a combustion fan 9 is attached, and a reformer exhaust port 11 are provided at the reformer 6. A water supply 12 is connected to the reformer 6 via a water supplying pipe 13.

The stack 7 is connected to the reformer 6 by a hydrogen supplying pipe 14, to the burner 10 by a hydrogen exhausting pipe 15, to an air blower 16 by an air supplying pipe 17, and to a condenser 18 by an air exhausting pipe 19.

On the outer wall of the main body package 2, an exhaust port 20 and an exhaust fan 21 are disposed, and a first air intake port 22 is provided at a location which is a windward of the reformer 6 and the stack 7.

An electric circuit 23 is connected to a commercial power source 24, and comprises: a power conversion circuit 25 which converts DC power from the stack 7 into AC power to supply the converted AC power to the commercial power source; and a control circuit 26.

The power conversion circuit 25 is constituted by circuits (not shown), such as a booster circuit and an inverter circuit, and sensors (not shown), such as a voltage sensor and a current sensor, and is connected so that the DC power from the stack 7 can be converted into AC power of the same phase as the AC power of a commercial power source, and the converted AC power is supplied to a load (not shown) connected to the commercial power source.

The stack 7 and the power conversion circuit 25 are electrically connected together by stack output lines 27, and power conversion circuit input terminals 32 are provided at the power conversion circuit 25 and arrayed in a direction parallel to the stacking direction of the stack 7.

In the stack 7, single cells 29 are stacked parallel to the power conversion circuit input terminals 32, and both sides of the single cells 29 in the stacking direction are sandwiched using a pair of current collecting plates 30. The current collecting plates 30 are provided with stack output terminals 31 which connect the stack output lines 27 together.

The control circuit 26 performs various kinds of control, such as the control of generated power in the system and the temperature control of the reformer 6 and the stack 7, by adjusting the flow rate of the town gas supplied to the reformer 6 from a town gas supplying pipe and adjusting the flow rate of the water supplied to the reformer 6, on the basis of the consumed power of the load.

A second air intake port 28 is provided on the outer wall of the main body package 2 in the windward side of the electric circuit 23.

The operations and advantages of the fuel cell power generation system configured as described above will be described below.

Material gas, such as methane supplied from the material gas supplying pipe 8, is heated by the burner 10 in the reformer 6 to cause a reforming reaction, is converted into hydrogen, and is supplied to the stack 7 through the hydrogen supplying pipe 14.

Meanwhile, the air sent from the air blower 16 is supplied to the stack 7 through the air supplying pipe 17, and electric power is generated by making the hydrogen and the oxygen in the supplied air react with each other.

The DC power generated in the stack 7 is input to the power conversion circuit 25 via the stack output lines 27, and the voltage thereof is increased or decreased to a prescribed voltage in the power conversion circuit 25. The production of electricity is changed according to a power request from an external load.

Also, the remaining hydrogen (exhausted hydrogen) which has not been used for the reaction is supplied to the burner 10 through the hydrogen exhausting pipe 15, and is used as the heating fuel of the reforming reaction.

Additionally, the exhausted air including the water and steam which have been generated in the reaction is led to the condenser 18 through the air exhausting pipe 19 to separate water. The water separated in the condenser 18 is supplied to the reformer 6 via the water supplying pipe 13 from the water supply 12, and is used as a material of the reforming reaction.

A series of these operations is controlled by the control circuit 26.

As described above, this embodiment is constituted by comprising: the reformer 6 and stack 7 which are arranged inside the main body package 2; the stack output terminals 31 provided at both ends of the stack 7 in the stacking direction; the power conversion circuit 25 which is arranged inside the main body package 2 and in the vicinity of the stack 7; the power conversion circuit input terminals 32 which are provided at the power conversion circuit 25 and arrayed in a direction parallel to the stacking direction of the stack 7; and the stack output lines 27 which electrically connect the stack output terminals 31 and the power conversion circuit input terminals 32 together. Since the stack 7 and the power conversion circuit 25 are electrically connected together at the shortest distance, the power loss in the stack output lines 27 can be reduced, and a fuel cell power generation system with high power generation efficiency can be provided.

Since the power loss in the stack output lines 27 does not increase, it is possible to increase a stack current, and it is possible to reduce the stack number of stack 7 with the object of cost reduction and downsizing.

The stacking direction of the stack 7 is made to be parallel to the power conversion circuit input terminals 32. With this configuration, since the stack output terminals 31 and the power conversion circuit input terminals 32 are made closer to each other, the stack output lines 27 become shorter, and the power loss in the stack output lines 27 can be further reduced.

Since the hydrogen supplying pipe 14, the hydrogen exhausting pipe 15, the air supplying pipe 17, and air exhausting pipe 19 are connected to both the current collecting plates 30, the stack output terminals 31 and the power conversion circuit input terminals 32 are made closer to each other.

Figure 3:
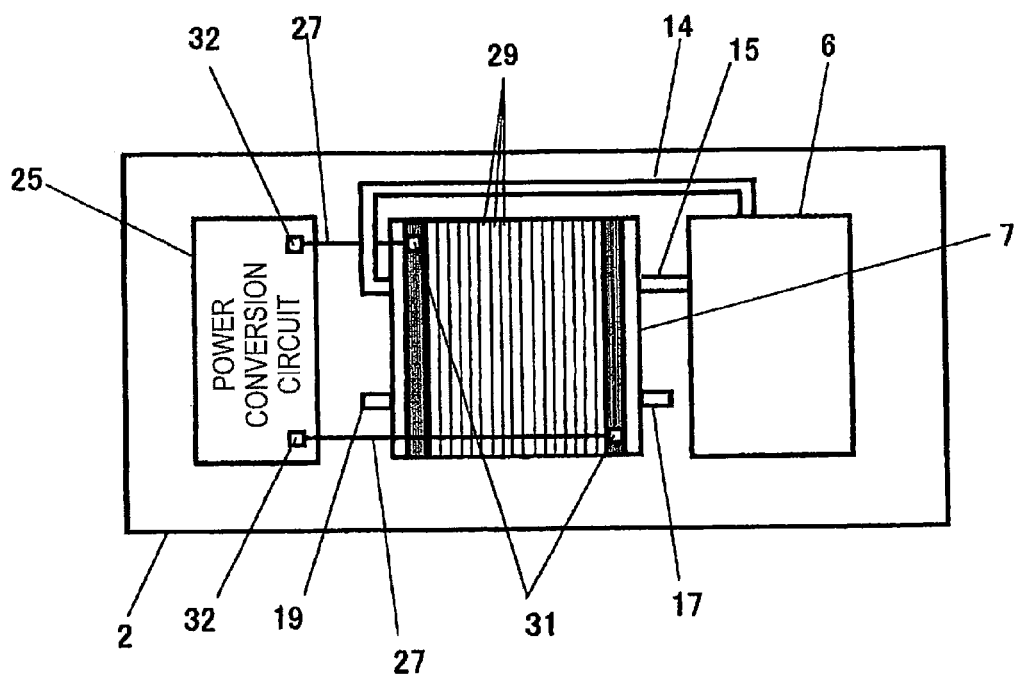
FIG. 3 is a top view showing a fuel cell power generation system of a comparative example.

On the other hand, if the stacking direction of the stack 7 is not parallel to the power conversion circuit input terminals 32, as shown in a comparable example of FIG. 3, one of the current collecting plates, i.e., one of the stack output terminals 31 is arranged apart from the power conversion circuit 25. Therefore, one stack output line 27 becomes long, and the power loss in the stack output lines 27 increases.

Additionally, since the hydrogen supplying pipe 14, the hydrogen exhausting pipe 15, the air supplying pipe 17, and the air exhausting pipe 19 are connected to both sides of the current collecting plates 30, the hydrogen supplying pipe 14 and the air exhausting pipe 19 are arranged between the stack output terminals 31 and the power conversion circuit input terminals 32. Accordingly, the distance between the stack output terminals 31 and the power conversion circuit input terminals 32 becomes long.

(Second Embodiment)

Figure 4:
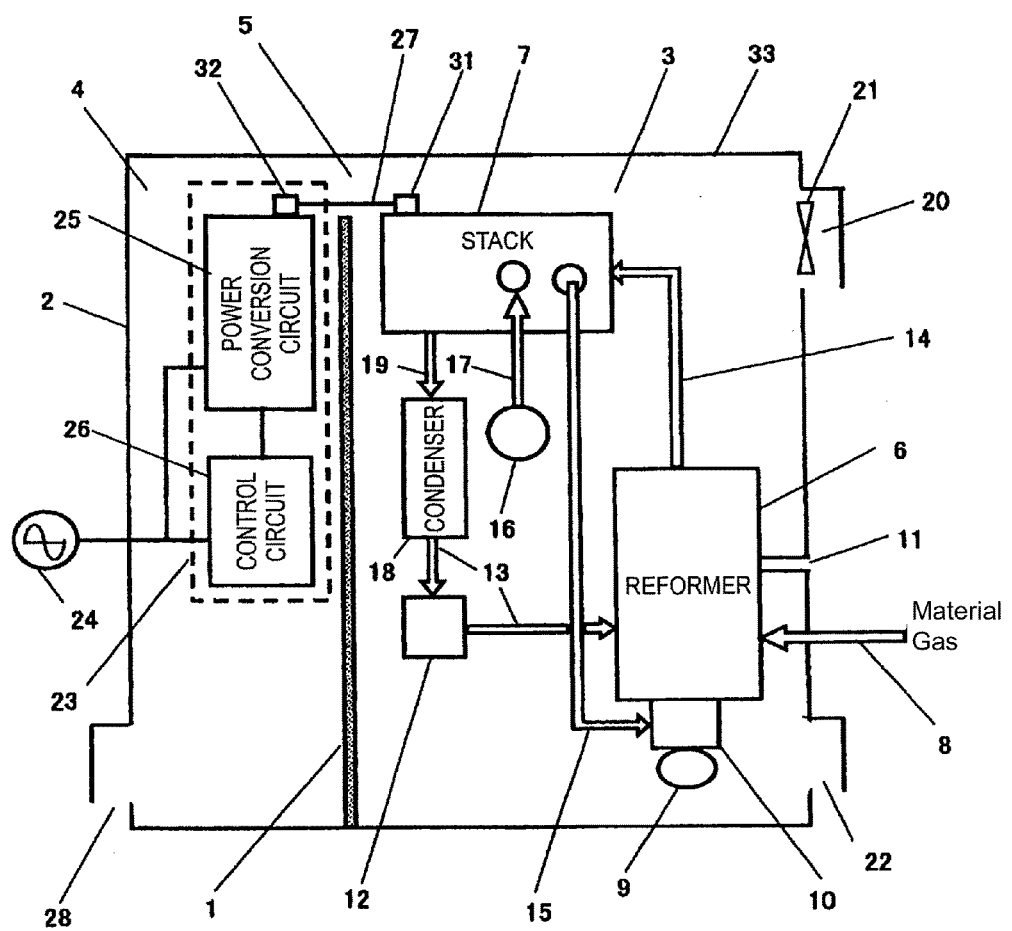
FIG. 4 is a view showing a configuration of a fuel cell power generation system according to second through seventh embodiments.
Figure 5:
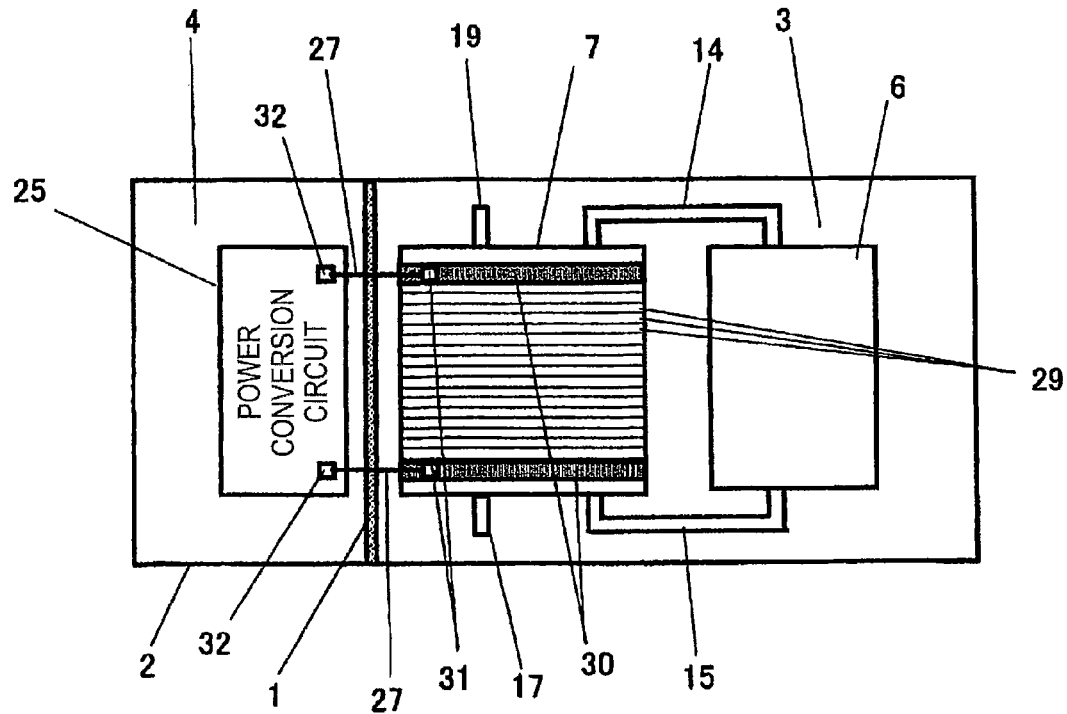
FIG. 5 is a top view of the fuel cell power generation system.

FIGS. 4 and 5 are views showing a configuration of a fuel cell power generation system according to a second embodiment of the invention.

As shown in FIGS. 4 and 5, a main body package 2 is separated by a partition wall 1 into a first chamber 3 having a gas path and a second chamber 4 having no gas path. A gap 5 is provided above the partition wall 1. Parts such as a reformer 6 and a stack 7, through which inflammable gas circulates are arranged in the first chamber 3.

A material gas supplying pipe 8, a burner 10 to which a combustion fan 9 is attached, and a reformer exhaust port 11 are provided at the reformer 6. A water supply 12 is connected to the reformer 6 via a water supplying pipe 13.

The stack 7 is connected to the reformer 6 by a hydrogen supplying pipe 14, to the burner 10 by a hydrogen exhausting pipe 15, to an air blower 16 by an air supplying pipe 17, and to a condenser 18 by an air exhausting pipe 19.

On the outer wall of the first chamber 3, an exhaust port 20 and an exhaust fan 21 are provided so that the second chamber 4 is located windward and the first chamber 3 is located leeward, and a first air intake port 22 is provided to be windward of the reformer 6 and the stack 7.

An electric circuit 23 is connected to a commercial power source 24, and is disposed in the second chamber. The electric circuit 23 comprises: a power conversion circuit 25 which converts DC power from the stack 7 into AC power to supply the converted AC power to the commercial power source; and a control circuit 26.

The power conversion circuit 25 is constituted by circuits (not shown), such as a booster circuit and an inverter circuit, and sensors (not shown), such as a voltage sensor and a current sensor, and is connected so that the DC power from the stack 7 can be converted into AC power of the same phase as the AC power of a commercial power source and the converted AC power is supplied to a load (not shown) connected to the commercial power source.

The stack 7 and the power conversion circuit 25 are electrically connected together by stack output lines 27, and the stack output lines 27 pass through the gap 5 provided above the partition wall 1.

In the stack 7, single cells 29 are stacked parallel to power conversion circuit input terminals 32, and both sides of the single cells 29 in the stacking direction are sandwiched using a pair of current collecting plates 30. The current collecting plates 30 are provided with stack output terminals 31 which connect the stack output lines 27 together.

The control circuit 26 performs various kinds of control, such as the control of generated power in the system and the temperature control of the reformer 6 and the stack 7, by adjusting the flow rate of town gas supplied to the reformer 6 from a town gas supplying pipe and adjusting the flow rate of the water supplied to the reformer 6, on the basis of the consumed power of the load.

A second air intake port 28 is provided on the outer wall of the second chamber in the windward side of the electric circuit 23.

The operation and advantages of the fuel cell power generation system configured as described above will be described below.

Material gas, such as methane supplied from the material gas supplying pipe 8, is heated by the burner 10 in the reformer 6 to cause a reforming reaction, is converted into hydrogen, and is supplied to the stack 7 through the hydrogen supplying pipe 14.

Meanwhile, the air sent from the air blower 16 is supplied to the stack 7 through the air supplying pipe 17, and electric power is generated by making the hydrogen and the oxygen in the air which are supplied react with each other.

The DC power generated in the stack 7 is input to the power conversion circuit 25 via the stack output lines 27, and the voltage thereof is increased or decreased to a prescribed voltage in the power conversion circuit 25. The production of electricity is changed according to a power request from an external load.

Also, the remaining hydrogen (exhausted hydrogen) which has not been used for the reaction is supplied to the burner 10 through the hydrogen exhausting pipe 15, and is used as the heating fuel of the reforming reaction.

The exhausted air including the water and steam which have been generated in the reaction is led to the condenser 18 through the air exhausting pipe 19. The water separated in the condenser 18 is supplied to the reformer 6 via the water supplying pipe 13 from the water supply 12, and is used as a material of the reforming reaction.

A series of these operations is controlled by the control circuit 26.

As described above, this second embodiment is constituted by comprising: the partition wall 1 which separates the inside of the main body package 2 into the first chamber 3 and the second chamber 4, and has the gap 5 provided thereabove; the stack 7 arranged inside the first chamber 3; the electric circuit 23 having the power conversion circuit 25 and the control circuit 26 and arranged inside the second chamber 4; and the stack output lines 27 which extend through the gap 5 to electrically connect the power conversion circuit 25 and the stack 7 together. Since the stack 7 and the power conversion circuit 25 can be connected together at the shortest distance, the power loss in the stack output lines which connect the stack 7 and the power conversion circuit 25 together can be reduced, and a fuel cell power generation system with high power generation efficiency can be provided.

Since the power loss in the stack output lines does not increase, it is possible to increase a stack current, and it is possible to reduce the stack number of stack 7 with the object of cost reduction and downsizing.

(Third Embodiment)

A third embodiment 3 of the invention will be described with reference to FIGS. 4 and 5.

Although the third embodiment has the same basic configuration as the second embodiment, the following points will be described herein in more detail. In addition, description of the contents already described in the above second embodiment will be omitted.

In the third embodiment, the stacking direction of the stack 7 is made to be parallel to the partition wall 1, single cells 29 are stacked parallel to the partition wall 1, and both sides of the single cells 29 in the stacking direction are sandwiched using a pair of current collecting plates 30. The current collecting plates 30 are provided with stack output terminals 31 which connect the stack output lines 27 together. The power conversion circuit 25 is provided with power conversion circuit input terminals 32.

With this configuration, since the stack output terminals 31 and the power conversion circuit input terminals 32 for connecting the stack output lines 27 are made close to each other, the stack output lines 27 become short, and the power loss in the stack output lines 27 can be reduced.

Figure 6:
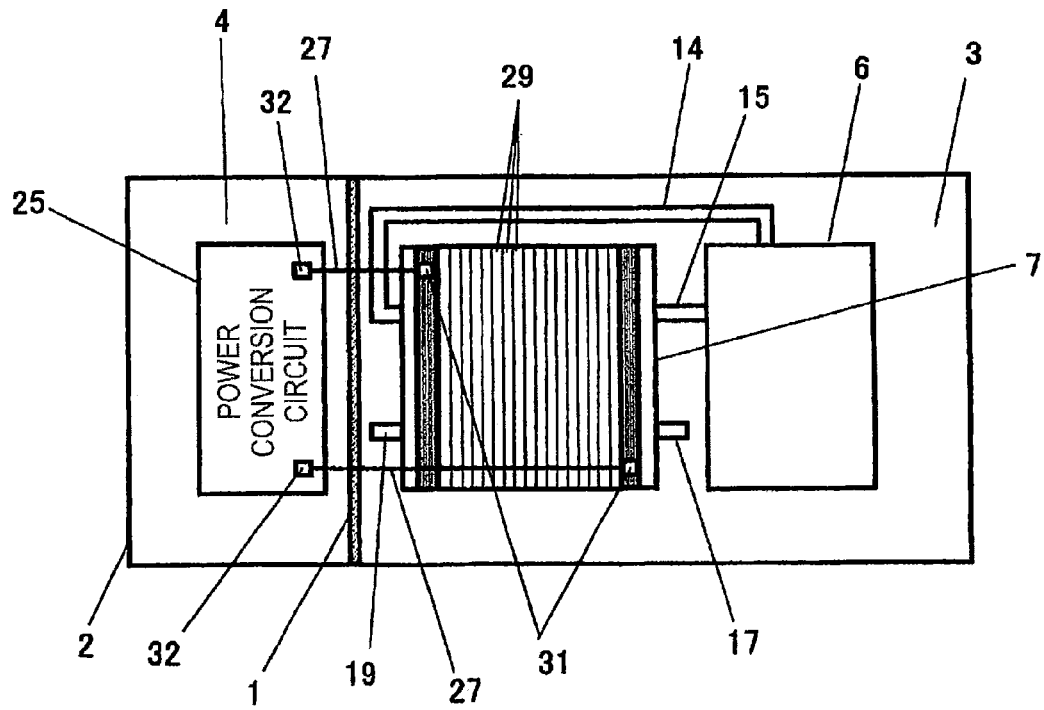
FIG. 6 is a top view showing a fuel cell power generation system of a comparative example.

On the other hand, if the stacking direction of the stack 7 is not parallel to the partition wall 1, as shown in a comparable example of FIG. 6, one of the current collecting plates, i.e., one of the stack output terminals 31 is arranged apart from the power conversion circuit 25. Therefore, one stack output line 27 becomes long, and the power loss in the stack output lines 27 increases.

(Fourth Embodiment)

A fourth embodiment of the invention will be described with reference to FIG. 4 similarly to the above.

Although the fourth embodiment 4 has the same basic configuration as the second embodiment, the following points will be described herein in more detail. In addition, description of the contents already described in the second embodiment will be omitted.

In the fourth embodiment, the stack 7 is arranged adjacent to the partition wall 1 and adjacent to a top face 33 of the main body package 2, and the power conversion circuit 25 is arranged adjacent to the partition wall 1 and adjacent to the top face 33 of the main body package 2. Since this allows the stack 7 and the power conversion circuit 25 to be arranged close to each other, the stack output lines 27 become short, and the power loss in the stack output lines 27 can be further reduced.

(Fifth Embodiment)

A fifth embodiment of the invention will be described with reference to FIGS. 4 and 5 similarly to the above.

Although the fifth embodiment has the same basic configuration as the second embodiment, the following points will be described herein in more detail. In addition, description of the contents already described in the second embodiment will be omitted.

In the fifth embodiment, the stack 7 and the power conversion circuit 25 face each other across the partition wall 1. Since this allows the stack 7 and the power conversion circuit 25 to be arranged adjacent to or close to each other, the stack output lines 27 become short, and the power loss in the stack output lines 27 can be further reduced.

(Sixth Embodiment)

A sixth embodiment of the invention will be described with reference to FIGS. 4 and 5 similarly to the above.

Although this embodiment has the same basic configuration as the second embodiment, the following points will be described herein in more detail. In addition, description of the contents already described in the second embodiment will be omitted.

In the fifth embodiment, the top face of the stack 7 and the top face of the power conversion circuit 25 are arranged almost at the same height. Since this allows the stack 7 and the power conversion circuit 25 to be arranged close to each other and at almost the same height, the stack output lines 27 become short, and the power loss in the stack output lines 27 can be further reduced.

(Seventh Embodiment)

A seventh embodiment of the invention will be described with reference to FIGS. 4 and 5 similarly to the above.

Although this Embodiment has the same basic configuration as the sixth embodiment, the following points will be described herein in more detail. In addition, description of the contents already described in the above embodiment will be omitted.

In the seventh embodiment, the stack output lines 27 electrically connect the stack output terminals 31 provided on the top face of the stack 7, and the power conversion circuit input terminals 32 provided in the upper portion of the power conversion circuit 25. Thereby, the stack output lines 27 become short, and the power loss in the stack output lines 27 can be further reduced.

(Eighth Embodiment)

Figure 7:
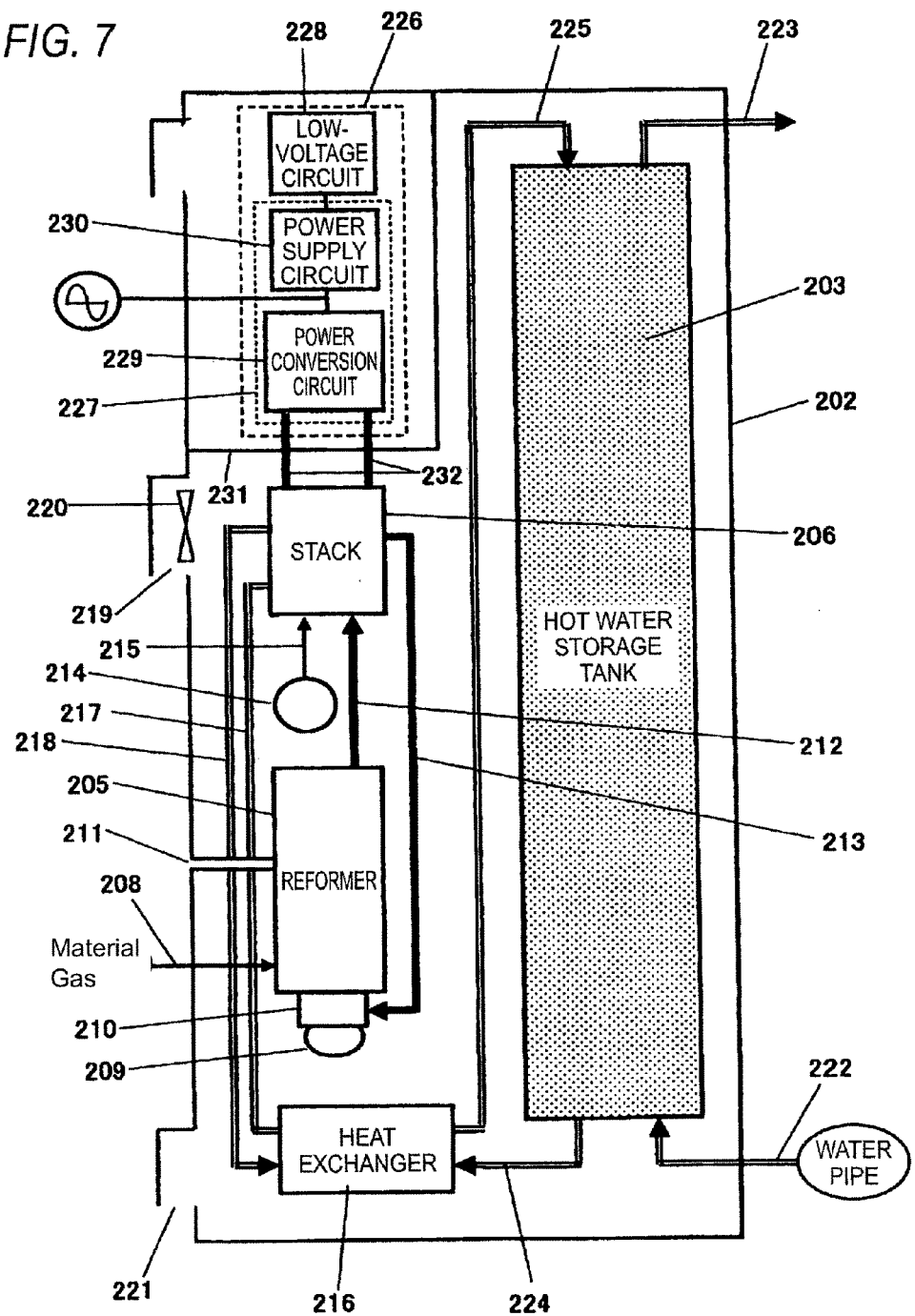
FIG. 7 is a view showing a configuration of a fuel cell power generation system according to eighth and tenth embodiments.

FIG. 7 shows a configuration of a fuel cell power generation system according to an eighth embodiment of the invention.

As shown FIG. 7, components such as a reformer 205 and a stack 206, through which inflammable gas circulates are arranged in a main body package 202.

A material gas supplying pipe 208, a burner 210 to which a combustion fan 209 is attached, and a reformer exhaust port 211 are provided at the reformer 205.

The stack 206 is connected to the reformer 205 by a hydrogen supplying pipe 212, to the burner 210 by an exhausted hydrogen supplying pipe 213, to an air blower 214 by an air supplying pipe 215, and to a heat exchanger 216 by a cold water pipe 217 and a hot water pipe 218.

On the outer wall of the main body package 202, an exhaust port 219 and a ventilation fan 220 are disposed, and an air intake port 221 is provided in windward of the reformer 205 and the stack 206.

A water supplying pipe 222 from a water pipe is attached to the bottom of a hot water storage tank 203, and a hot water pipe 223 is attached to the top of the hot water storage tank 203. A cold water pipe 224 connected to the heat exchanger 216 is attached to the bottom of the hot water storage tank 203, and a hot water pipe 225 connected to the heat exchanger 216 is attached to the top of the hot water storage tank 203.

An electric circuit 226 has a high-voltage circuit 227 which handles 100 V or more, and a low-voltage circuit 228. The high-voltage circuit 227 is connected to a commercial power source, and comprises: a power conversion circuit 229 which converts DC power from the stack 206 into AC power to supply the converted AC power to the commercial power source; and a power circuit 230 which converts an AC commercial power source into a DC low voltage.

The high-voltage circuit 227 is arranged above the stack 206 and the reformer 205, and is separated from the stack 206 and the reformer 205 by a partition wall 231.

The power conversion circuit 229 is constituted by circuits (not shown), such as a booster circuit and an inverter circuit, and sensors (not shown), such as a voltage sensor and a current sensor, and is connected so that DC power from the fuel cell stack 206 can be converted into AC power of the same phase as the AC power of a commercial power source and the converted AC power is supplied to a load (not shown) connected to the commercial power source.

The low-voltage circuit 228 is control means which controls respective components in the main body package 202. The low-voltage circuit 228 is control means which performs various kinds of control, such as the control of generated power in the system and the temperature control of the reformer 205 and the stack 206, by adjusting the flow rate of town gas supplied to the reformer 205 from a town gas supplying pipe and adjusting the flow rate of the water supplied to the reformer 205, on the basis of the consumed power of the load.

The operation and advantages of the fuel cell power generation system configured as described above will be described below.

Material gas, such as methane supplied from the material gas supplying pipe 208, is heated by the burner 210 in the reformer 205 to cause a reforming reaction, is converted into hydrogen, and is supplied to the stack 206 through the hydrogen supplying pipe 212.

Meanwhile, the air sent from the air blower 214 is supplied to the stack 206 through the air supplying pipe 215, and electric power is generated by making the hydrogen and the oxygen in the air which are supplied react with each other.

Also, the remaining hydrogen (exhausted hydrogen) which has not been used for the reaction is supplied to the burner 210 through the exhausted hydrogen supplying pipe 213, and is used as the heating fuel of the reforming reaction.

As described above, according to this eighth embodiment, there is provided a fuel cell power generation system comprising, in the main body package 202, the hot water storage tank 203; the stack 206; the reformer 205; the electric circuit 226 having the high-voltage circuit 227 including the power conversion circuit 229 and the low-voltage circuit 228; the ventilation fan 220 which discharges the air in the main body package 202 to the outside; and the air intake port 221 provided in the lower portion of the main body package 202 below the stack 206 and the reformer 205. The ventilation fan 220 is provided above a space where the stack 206 and the reformer 205 are arranged in the main package 202. The stack 206, the reformer 205, and the electric circuit 226 are vertically arranged in the lateral side of the hot water storage tank 203 so as to be almost at the same height as the hot water storage tank 203. The high-voltage circuit 227 is arranged above the stack 206 and the reformer 205. The inside of the main body package 202 is separated by the partition wall 231 into a space where the stack 206 and the reformer 205 are arranged, and a space where the high-voltage circuit 227 is arranged.

With the above configuration, a space-saving fuel cell power generation system in which a hot water storage tank is integrated can be provided by housing respective components of a fuel cell and the hot water storage tank 203 in the main body package 202.

Even if inflammable gas, such as material gas and hydrogen, has leaked from the reformer 205 or the stack 206, the inflammable gas leaks into the main body package 202 in which the reformer 205 and the stack 206 are provided. However, the ambient air sucked from the air intake port 221 provided in the lower portion of the main body package 202 below the reformer 205 and the stack 206 pushes out the inflammable gas which has leaked into the main body package 202. Then, the inflammable gas is exhausted to the outside by the ventilation fan 220 provided in the upper portion of a space where the stack 206 and the reformer 205 in the main body package 202 are arranged.

Even if, at the worst, an arc happens to be generated under a condition that dust is accumulated on a contact of the high-voltage circuit 227 after long-term use in an environment with a great deal of dust, or a condition that moisture is adhered to the contact of the high-voltage circuit 227 after long-term use in high-humidity environment, inflammable gas such as material gas or hydrogen will not reach the high-voltage circuit 227 because the inside of the main body package 202 is separated into a space where the stack 206 and the reformer 205 are arranged, and a space where the high-voltage circuit 227 is arranged by the partition wall 231. Accordingly, danger such as explosion is definitely eliminated.

(Ninth Embodiment)

Figure 8:
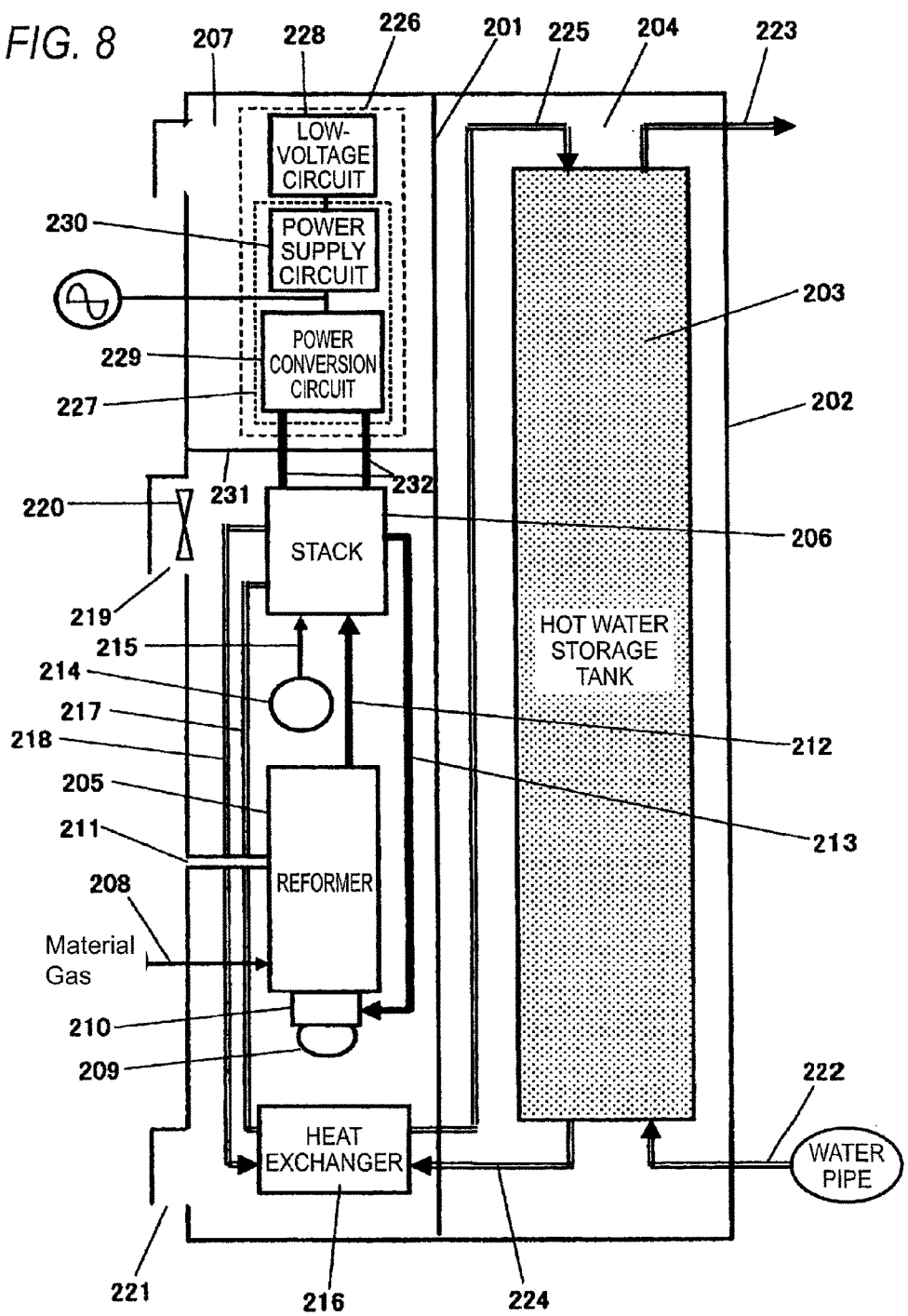
FIG. 8 is a view showing a configuration of a fuel cell power generation system according to a ninth embodiment of the invention.

FIG. 8 shows a configuration of a fuel cell power generation system according to a ninth embodiment of the invention.

As shown in FIG. 8, according to the ninth embodiment, a partition wall 201 for partitioning the inside of the main body package 202 into a first chamber 204 having the hot water storage tank 203, and a second chamber 207 where components, such as the reformer 205 and the stack 206, through which inflammable gas circulates, is provided.

A material gas supplying pipe 208, a burner 210 to which a combustion fan 209 is attached, and a reformer exhaust port 211 are provided at the reformer 205.

The stack 206 is connected to the reformer 205 by a hydrogen supplying pipe 212, to the burner 210 by an exhausted hydrogen supplying pipe 213, to an air blower 214 by an air supplying pipe 215, and to a heat exchanger 216 by a cold water pipe 217 and a hot water pipe 218.

On the outer wall of the main body package 202, an exhaust port 219 and a ventilation fan 220 are provided, and an air intake port 221 is provided in windward of the reformer 205 and the stack 206.

A water supplying pipe 222 from a water pipe is attached to the bottom of the hot water storage tank 203, and a hot water pipe 223 is attached to the top of the hot water storage tank 203. A cold water pipe 224 connected to the heat exchanger 216 is attached to the bottom of the hot water storage tank 203, and a hot water pipe 225 connected to the heat exchanger 216 is attached to the top of the hot water storage tank 203.

An electric circuit 226 has a high-voltage circuit 227 which handles 100 V or more, and a low-voltage circuit 228. The high-voltage circuit 227 is connected to a commercial power source, and comprises: a power conversion circuit 229 which converts the DC power from the stack 206 into AC power to supply the converted AC power to the commercial power source; and a power circuit 230 which converts an AC commercial power source into a DC low voltage.

The high-voltage circuit 227 is arranged above the stack 206 and the reformer 205, and is separated from the stack 206 and the reformer 205 by a partition wall 231.

The power conversion circuit 229 is constituted by circuits (not shown), such as a booster circuit and an inverter circuit, and sensors (not shown), such as a voltage sensor and a current sensor, and is connected so that the DC power from the fuel cell stack 206 can be converted into AC power of the same phase as the AC power of a commercial power source and the converted AC power is supplied to a load (not shown) connected to the commercial power source.

The low-voltage circuit 228 is control means which controls respective parts in the main body package 202. The control circuit 228 is control means which performs various kinds of control, such as the control of generated power in the system and the temperature control of the reformer 205 and the stack 206, by adjusting the flow rate of town gas supplied to the reformer 205 from a town gas supplying pipe and adjusting the flow rate of the water supplied to the reformer 205, on the basis of the consumed power of the load.

The operation and advantages of the fuel cell power generation system configured as described above will be described below.

Material gas, such as methane supplied from the material gas supplying pipe 208, is heated by the burner 210 in the reformer 205 to cause a reforming reaction, is converted into hydrogen, and is supplied to the stack 206 through the hydrogen supplying pipe 212.

Meanwhile, the air sent from the air blower 214 is supplied to the stack 206 through the air supplying pipe 215, and electric power is generated by making the hydrogen and the oxygen in the air which are supplied react with each other.

Also, the remaining hydrogen (exhausted hydrogen) which has not been used for the reaction is supplied to the burner 210 through the exhausted hydrogen supplying pipe 213, and is used as the heating fuel of the reforming reaction.

As described above, in a fuel cell power generation system according to the ninth embodiment, the hot water storage tank 203 in the first chamber 204 of the main body package 202; there are disposed, in the second chamber 207 of the main body package 202, the stack 206, the reformer 205, the electric circuit 226 having the high-voltage circuit 227 including the power conversion circuit 229 and the low-voltage circuit 228, the ventilation fan 220 which discharges the air in the second chamber 207 to the outside, and the air intake port 221 provided in the lower portion of the second chamber 207 below the stack 206 and the reformer 205. The ventilation fan 220 is provided above a space where the stack 206 and the reformer 205 in the second chamber 207 are arranged. The stack 206, the reformer 205, and the electric circuit 226 are vertically arranged in the lateral side of the hot water storage tank 203 so as to be almost at the same height as the hot water storage tank 203. The high-voltage circuit 227 is arranged above the stack 206 and the reformer 205. The second chamber 207 is separated by the partition wall 231 into a space where the stack 206 and the reformer 205 are arranged, and a space where the high-voltage circuit 227 is arranged.

That is, the ninth embodiment is obtained by arranging the hot water storage tank 203 of the eighth embodiment in the first chamber 204 of the main body package 202, and arranging the stack 206 and the reformer 205, the electric circuit 226, the ventilation fan 220, and the air intake port 221 of the eighth embodiment in the second chamber 207 of the main body package 202. Similarly to the eighth embodiment, a space-saving fuel cell power generation system in which a hot water storage tank is integrated can be obtained.

Even if inflammable gas, such as material gas and hydrogen, has leaked from the reformer 205 or the stack 206, or, at the worst, an arc happens to be generated under a condition that dust is accumulated on a contact of the high-voltage circuit 227 after long-term use in an environment with a great deal of dust, or a condition that moisture is adhered to the contact of the high-voltage circuit 227 after long-term use in high-humidity environment, danger such as explosion is definitely eliminated.

(Tenth Embodiment)

A tenth embodiment of the invention will be described with reference to FIG. 7 similarly to the above.

Although this tenth embodiment has the same basic configuration as the eighth embodiment, the following points will be described herein in more detail. In this embodiment, description of the contents already described will be omitted.

In the tenth embodiment, the stack 206 and the power conversion circuit 229 face each other across the partition wall 231. Since this allows the stack 206 and the power conversion circuit 229 to be arranged close to (adjacent to) each other, the stack output lines 232 become short, and the stack 206 and the power conversion circuit 229 can be electrically connected together with a short distance. Accordingly, the copper loss in the stack output lines 232 which connect the stack 206 and the power conversion circuit 229 together is reduced, so that the power loss in the stack output lines 232 can be reduced, and the efficiency of the fuel cell power generation system can be improved.

(Eleventh Embodiment)

Figure 9:
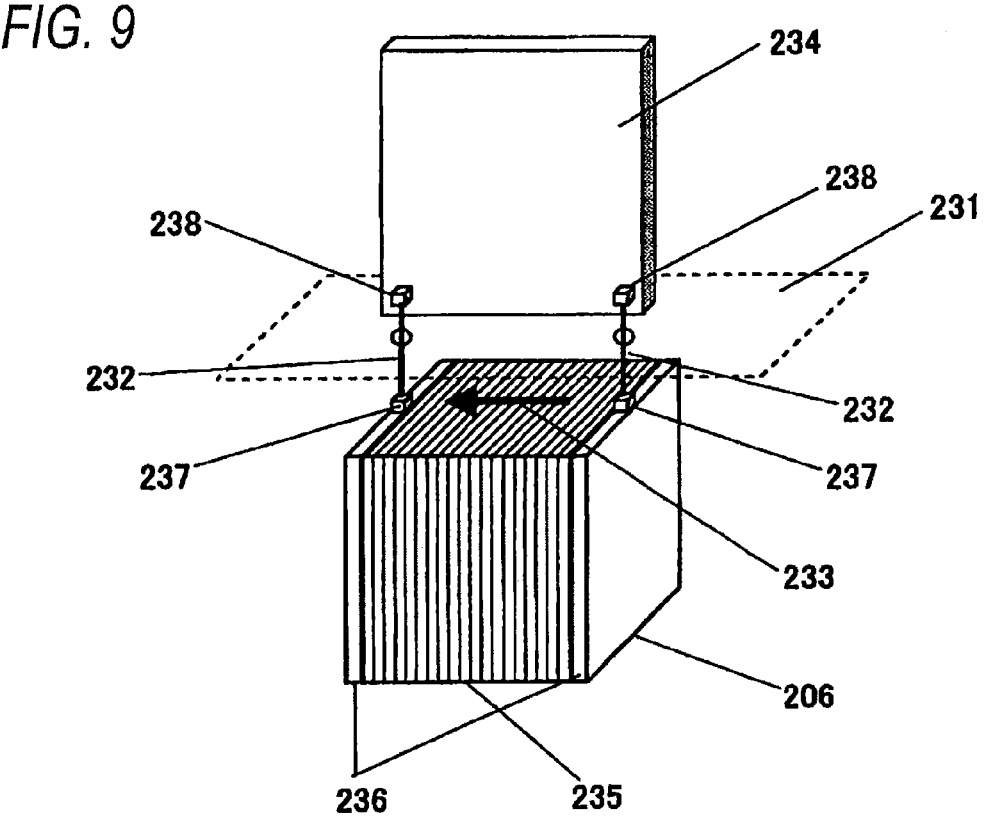
FIG. 9 is a view showing a configuration of a fuel cell power generation system according to an eleventh embodiment of the invention.

An eleventh embodiment of the invention will be described with reference to FIG. 9.

Although the eleventh embodiment has the same basic configuration as the eighth embodiment, the following points will be described herein in more detail. In this embodiment, description of the contents already described will be omitted.

In the eleventh embodiment, a stacking direction 233 of the stack 206 is substantially parallel to the surface of a power conversion circuit board 234 which is a substrate of the power conversion circuit 229, single cells 235 are stacked in a direction parallel to the surface of the power conversion circuit board 234, and both sides of the single cells 235 in the stacking direction 233 are sandwiched using a pair of current collecting plates 236. The current collecting plates 236 are provided with stack output terminals 237 which connect the stack output lines 232 together. The power conversion circuit board 234 is provided with power conversion circuit input terminals 238.

With this configuration, since the stack output terminals 236 and the power conversion circuit input terminals 237 for connecting the stack output lines 232 are made close to each other, the stack output lines 232 become the shortest, and the stack output terminals 236 of the stack 206 and the power conversion circuit negative terminals 237 of the power conversion circuit 229 can be electrically connected together at the shortest distance. Accordingly, the copper loss in the stack output lines 232 which connect the stack and the power conversion circuit together is reduced, so that the power loss in the stack output lines 232 can be reduced, and the efficiency of the fuel cell power generation system can be improved.

Figure 10:
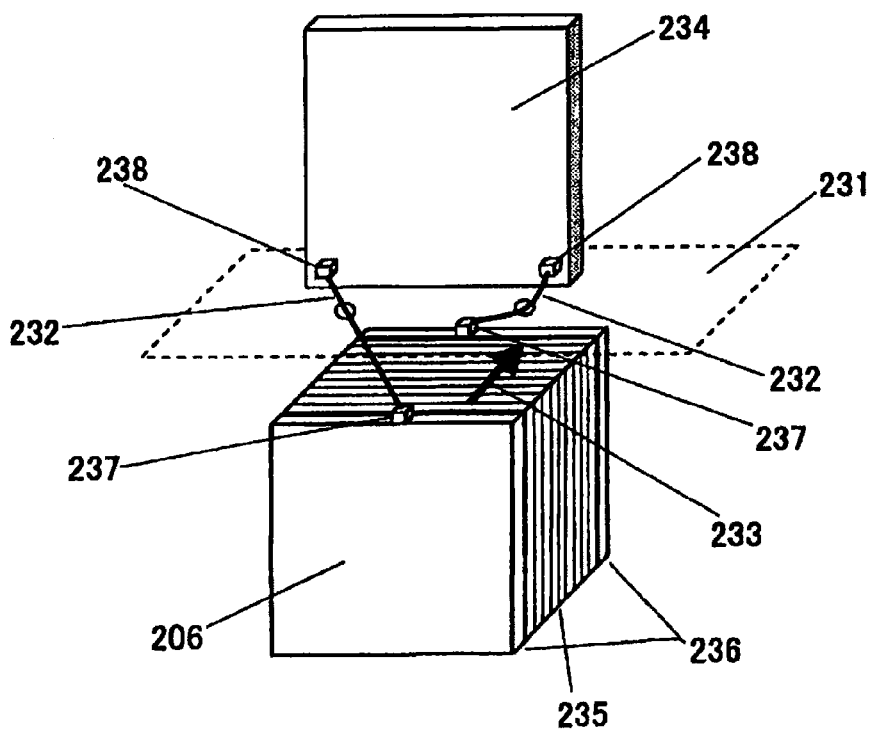
FIG. 10 is a view showing a fuel cell power generation system of a comparative example wherein a stack stacking direction is orthogonal to a power conversion circuit board.

On the other hand, when the stacking direction 233 of the stack 206 is not substantially parallel to the surface of the power conversion circuit board 234 (for example, orthogonal), as shown in a comparable example of FIG. 10, since the stack output terminals 237 and the power conversion circuit input terminals 238 are at separated positions, and the stack output lines 232 become long, the copper loss in the stack output lines 232 increases, the power loss in the stack output lines 232 increases, and the efficiency of the fuel cell power generation system decreases.

(Twelfth Embodiment)

Figure 11:
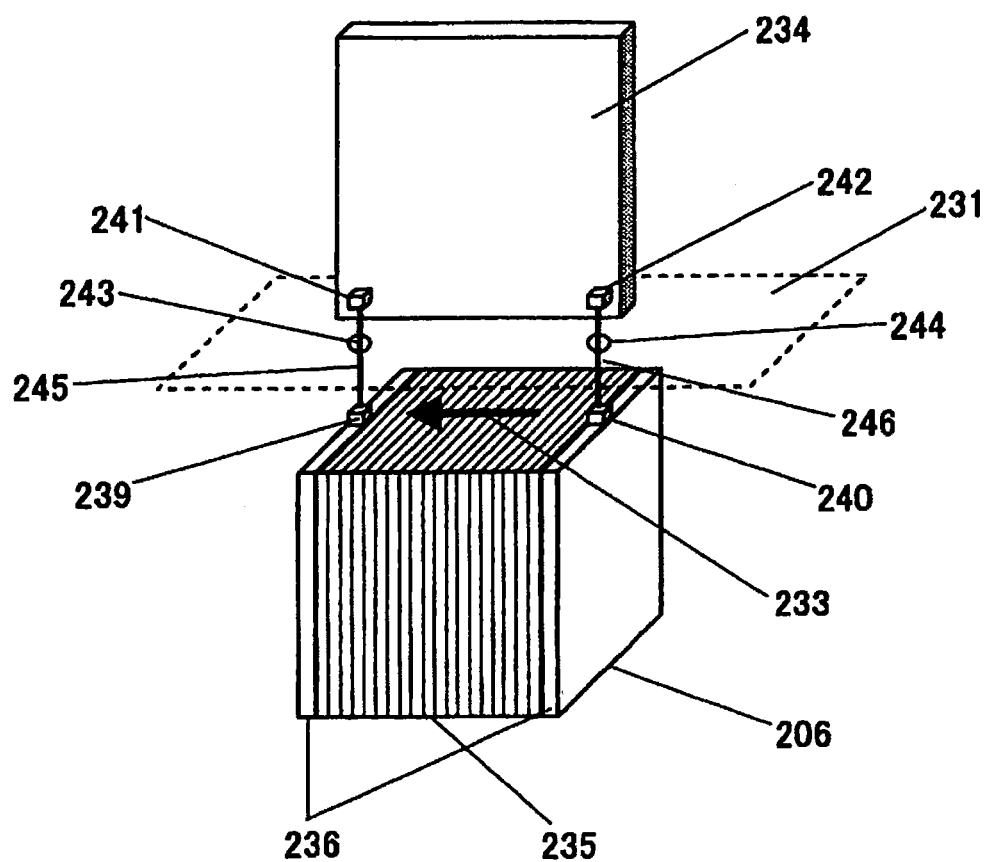
FIG. 11 is a view showing a configuration of a fuel cell power generation system according to twelfth and thirteenth embodiments.
Figure 12:
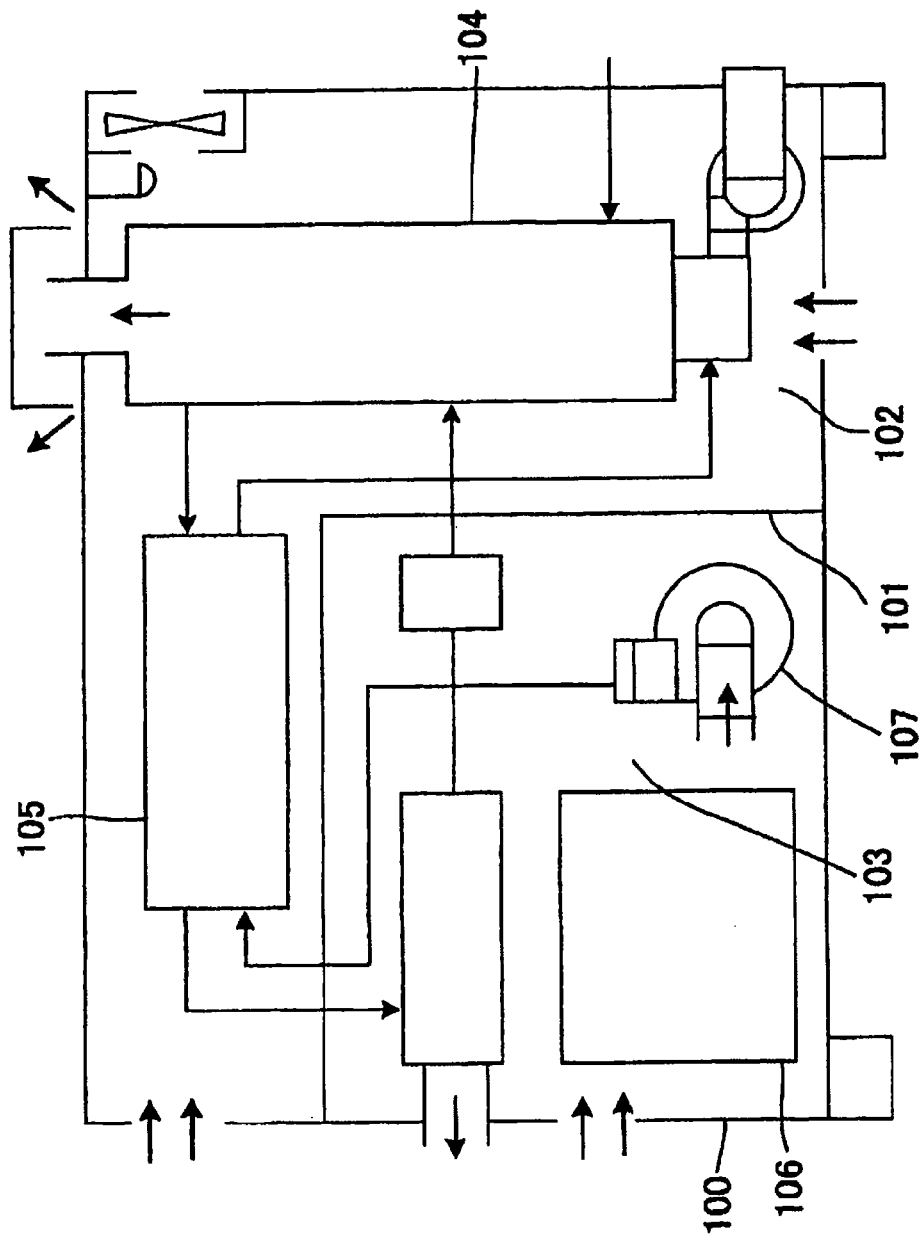
FIG. 12 is a view showing a fuel cell power generation system of a first conventional example.
Figure 13:
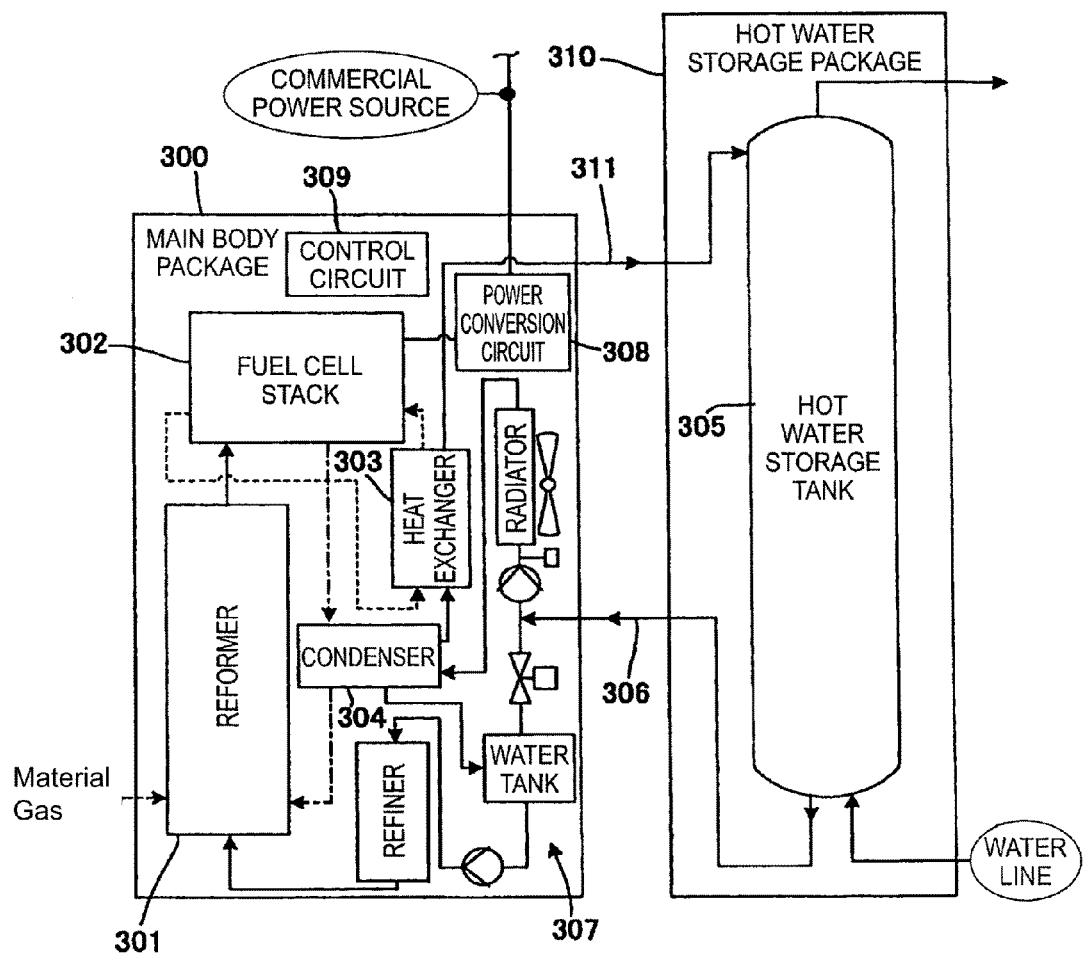
FIG. 13 is a view showing a fuel cell power generation system of a second conventional example.

A twelfth embodiment of the invention will be described with reference to FIG. 11.

Although the twelfth embodiment has the same basic configuration as the eighth embodiment, the following points will be described herein in more detail. In this embodiment, description of the contents already described will be omitted.

In this twelfth embodiment, a stack 206 has a stack positive terminal 239 at an upper portion of one end of the stack 206 in the stacking direction, and a stack negative terminal 240 provided at an upper portion of the other end of the stack 206 in the stacking direction. The power conversion circuit board 234 of the power conversion circuit 229 has a power conversion circuit positive terminal 241 and a power conversion circuit negative terminal 242 at a lower portion thereof. The stack positive terminal 239 and the power conversion circuit positive terminal 241 are arranged at substantially opposed positions across the partition wall 231, and the stack negative terminal 240 and the power conversion circuit negative terminal 242 are arranged at substantially opposed positions across the partition wall 231.

With this configuration, since the stack positive terminal 239 and the power conversion circuit positive terminal 241 are made close to each other and the stack negative terminal 240 and the power conversion circuit negative terminal 242 are made close to each other, both the two sets of the stack positive terminal 239 and the power conversion circuit positive terminal 241, and the stack negative terminal 240 and the power conversion circuit negative terminal 242 can be electrically connected together at the shortest distance. Accordingly, the stack output lines 245 and 246 become short, and the copper loss in the stack output lines 245 and 246 which connect the stack 206 and the power conversion circuit 229 together is reduced, so that the power loss in the stack output lines 245 and 246 can be reduced, and the efficiency of the fuel cell power generation system can be improved.

(Thirteenth Embodiment)

A thirteenth embodiment of the invention will be described with reference to FIG. 11 similarly to the above.

Although the thirteenth embodiment has the same basic configuration as the twelfth embodiment, the following points will be described herein in more detail. In this embodiment, description of the contents already described will be omitted.

The thirteenth embodiment has a pair of through holes 243 and 244 provided in the partition wall 231, a stack positive output line 245 which electrically connects the stack positive terminal 239 and the power conversion circuit positive terminal 241 together and passes through one through hole 243, and a stack negative output line 246 which electrically connects the stack negative terminal 240 and the power conversion circuit negative terminal 242 together, and passes through the other through hole 244.

With this configuration, the stack positive terminal 239 and the power conversion circuit positive terminal 241 can be electrically connected together at the shortest distance by the stack positive outline line 245 passing through the through hole 243 of the partition wall 231, and the stack negative terminal 240 and the power conversion circuit negative terminal 242 can be electrically connected together at the shortest distance by a stack output negative line 246 passing through the through hole 244 of the partition wall 231. For this reason, since the stack positive terminal 239 and power conversion circuit positive terminal 241 are made close to each other, the stack positive output line 245 becomes short, and since the stack negative terminal 240 and the power conversion circuit negative terminal 242 are made close to each other, the stack output line 246 becomes short. Thereby, the copper loss in the stack output lines 245 and 246 is reduced, so that the power loss in the stack output lines 245 and 246 can be reduced, and the efficiency of the fuel cell power generation system can be improved.

Therefore, the invention is suitable for a fuel cell power generation system which requires downsizing, high efficiency, and reliability.

The present invention will not be limited to the above embodiments. Any modifications and applications made by one ordinary skilled person in the art with reference to the disclosure of the specification and well-known arts will be comprehended by the claimed scope.

The present invention is based on Japanese Patent Application No. 2007-314330 filed on Dec. 5, 2007, Japanese Patent Application No. 2008-164096 filed on Jun. 24, 2008, Japanese Patent Application No. 2008-262538 filed on Oct. 9, 2008. Those contents are incorporated herein by reference.

INDUSTRIAL APPLICABILITY

According to the fuel cell power generation system of the present invention, the stack and the power conversion circuit are disposed in the proximity to each other, and electrically connected together with the shortest distance. Accordingly, it is possible to reduce power loss in the stack output lines electrically connecting the stack and the power generation circuit. Moreover, since it is possible to increase the stack current, the stacking number of the stack can be decreased to attain cost reduction and downsizing. Therefore, it is applicable to various types of the fuel cell power generation system.

According to the fuel cell power generation system of the present invention, it is possible to provide a space-saving fuel cell integrated with a hot water storage tank.

Even if, at the worst, an arc happens to be generated under a condition that dust is accumulated on a contact of the high-voltage circuit after long-term use in an environment with a great deal of dust, or a condition that moisture is adhered to the contact of the high-voltage circuit after long-term use in high-humidity environment, inflammable gas such as material gas or hydrogen will not reach the high-voltage circuit because the inside of the main body package is separated by the partition wall into a space where the stack and the reformer are arranged and a space where the high-voltage circuit is arranged. Accordingly, danger such as explosion is definitely eliminated.

The stack output lines electrically connecting the stack and the power conversion circuit can be made shortest. Accordingly, it is possible to reduce copper loss in the stack output lines, thereby reducing power loss in the stack output lines to enhance the efficiency of the fuel cell power generation system. Therefore, it is suitable for the fuel cell power generation system which requires downsizing, high efficiency and reliability.

What is claimed is:

1. A fuel cell power generation system, comprising:
 a main housing;
 a first partition wall extensive to partition the main housing so as to form vertically aligned first and second spaces in the main housing, wherein the first space is located above the second space;
 a stack disposed in the second space;
 a reformer disposed in the second space in vertical alignment with the stack;
 an electric circuit disposed in the first space and comprising a high-voltage circuit including a power conversion circuit, wherein the high-voltage circuit is vertically aligned with the stack and the reformer;
 a ventilation fan disposed in the second space at least as high as the higher of the stack and the reformer to discharge air from the second space to an exterior of the main housing; and
 an air intake port provided in the main housing lower than the lower of the stack and the reformer to intake air from the exterior of the main housing into the second space.

2. The fuel cell power generation system according to claim 1, further comprising:
 a second partition wall extensive to partition the main housing so as to form horizontally arranged first and second chambers in the main housing, wherein the first partition wall partitions the second chamber into the vertically aligned first and second spaces; and
 a hot water storage tank disposed in the first chamber, wherein the hot water storage tank is vertically co-extensive and in parallel with at least the vertically aligned high-voltage circuit, stack and reformer.

3. The fuel cell power generation system according to claim 1, wherein the stack and the power conversion circuit oppose each other with the first partition wall positioned therebetween.

4. The fuel cell power generation system according to claim 3, wherein the stack comprises a stack of fuel cell layers arranged in a direction substantially parallel to a board face of the power conversion circuit.

5. The fuel cell power generation system according to claim 4, wherein the stack comprises stack positive and negative terminals positioned in an upper surface of the stack apart from each other in a direction in which the fuel cell layers are arranged, and
 the power conversion circuit comprises power conversion circuit positive and negative terminals provided in a lower surface of the power conversion circuit in vertical alignment, respectively, with the stack positive and negative terminals.

6. The fuel cell power generation system as set forth in claim 4, wherein
 the first partition wall is formed with a pair of through holes, and
 the stack positive and negative terminals are electrically connected, respectively, to the power conversion circuit positive and negative terminals with a pair of output lines vertically extending in parallel through the through holes.

* * * * *